United States Patent [19]
Ewald

[11] 3,841,748
[45] Oct. 15, 1974

[54] PROJECTOR LAP DISSOLVE DEVICE

[75] Inventor: William P. Ewald, Webster, N.Y.

[73] Assignee: Eastman Kodak Company, Rochester, N.Y.

[22] Filed: June 7, 1971

[21] Appl. No.: 150,484

[52] U.S. Cl.................. 353/83, 352/91, 352/134
[51] Int. Cl.. G03b 21/14, G03b 21/28, G03b 21/36
[58] Field of Search .................. 353/82, 83, 90, 94; 352/68, 91, 135

[56] References Cited
UNITED STATES PATENTS

| | | | |
|---|---|---|---|
| 1,141,885 | 6/1915 | Palmer................................. | 353/83 |
| 2,031,361 | 2/1936 | Bowen................................. | 353/94 |
| 2,858,731 | 11/1958 | Rehorn................................ | 353/82 |
| 3,218,920 | 11/1965 | Johnson.............................. | 353/83 |
| 3,510,657 | 5/1970 | Mangiaracina et al.............. | 353/82 |
| 3,514,198 | 5/1970 | Schacht et al....................... | 353/82 |
| 3,738,741 | 6/1973 | Fournie............................... | 353/83 |
| 3,765,756 | 10/1973 | Peterson et al..................... | 353/83 |
| 3,779,636 | 12/1973 | Peterson............................. | 353/93 |

Primary Examiner—Louis R. Prince
Assistant Examiner—Steven L. Stephan
Attorney, Agent, or Firm—M. S. Sales

[57] ABSTRACT

Apparatus for projecting slides alternately from two slide gates onto the same screen area includes a single lamp and two light paths each having a slide gate for receiving film transparencies. Light from the lamp is selectively directed along one of the two light paths by a device which includes first and second mirrors having first positions for reflecting different portions of the light from the light along the two light paths and each being movable to a second position when the other mirror is in the first position to gradually bar the light from the light path associated with the other mirror and to reflect the barred light along the other light path.

6 Claims, 4 Drawing Figures

PATENTED OCT 15 1974

WILLIAM P. EWALD
INVENTOR.

BY Milton S. Sales

H. H. J. Kline
ATTORNEYS

PROJECTOR LAP DISSOLVE DEVICE

CROSS REFERENCE TO RELATED APPLICATION

Reference is made to commonly assigned co-pending U.S. Pat. application Ser. No. 37,227, entitled Lap Dissolve Slide Projector, filed May 14, 1970 in the name of Donald M. Harvey, now U.S. Pat. No. 3,689,140.

BACKGROUND OF THE INVENTION

1. Field of the Invention

The present invention relates to projecting apparatus, and more specifically to means in such apparatus for causing one image which is projected on a screen by the apparatus to gradually fade or dissolve while another image takes its place.

2. Description of the Prior Art

The pleasing effect of lap dissolve slide projection has long been recognized and has given arise to numerous attempts to develop commercially acceptable projectors of that type. Basically, such a projector generally includes two laterally adjacent stationary slide gates, each of which is associated with its own objective lens system, whereby an image of a slide in either gate can be projected at the same location on a projection screen. As the slide in one gate is being displayed, the previously projected slide is removed from the other gate and replaced by the next slide to be shown. To change from one projected image to the next, the brightness of the image being displayed is gradually reduced while the projected image of the slide in the other gate is gradually increased in brightness, thus causing the former image to fade away as the latter image simultaneously comes into view. A projector of the type described is disclosed in commonly assigned U.S. Pat. application Ser. No. 37,227, filed May 14, 1970 in the name of Donald M. Harvey, now U.S. Pat. No. 3,689,140. In that projector, a mask is selectively movable across one or the other slide gates to block the light from the projection lens system associated with that gate while simultaneously uncovering the other slide gate to cause gradual fade out and feed in of the projected images of the slide transparency in those gates. Lap dissolves of this type have the disadvantage that only one half of the light from the projection lamp reaches the viewing screen.

Other apparatus for effecting lap dissolve of projected images include means, such as shown in U.S. Pat. No. 3,218,920 which issued Nov. 23, 1965 to K. R. Johnson, in which a pair of mirrors are selectively movable in the projection light path between a first position for directing light from one received slide transparency to the projection screen and a second position for directing light from another slide transparency to the projection screen. At the midpoint of the mirror travel, an equal amount of light from each transparency is projected. In moving between its first and second positions, the mirror arrangement in apparatus of this type must travel a distance equal to three times the width of the light path at the mirror.

SUMMARY OF THE INVENTION

The present invention also utilizes a shifting mirror arrangement for selectively reflecting light along different projection paths to dissolve one projected image into another when the mirrors are moved between first and second positions. However, by the present invention, we have provided a mirror arrangement in which the paths of movement of the mirrors need be only twice the lateral width of the projection light path at the mirrors.

Accordingly, a preferred embodiment of the present invention includes projecting apparatus having means for receiving a pair of film transparencies and first and second mirrors which are independently movable between first and second positions. When both mirrors are in their first positions, they reflect to the projection screen equal portions of the light from a lamp. When one of the mirrors is moved to its second position, that mirror reflects all of the light from the projection lamp to the projection screen and blocks the light from reaching the other mirror.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the acconpanying drawing, in which.

DESCRIPTION OF THE PREFERRED EMBODIMENT

Although the present invention is shown in a slide projector in the illustrative embodiment, it will be understood that apparatus in accordance with the invention may be used in other types of projectors. Because slide projectors are well known, the present description will be directed in particular to elements forming part of, or cooperating more directly with, apparatus in accordance with the present invention. It is to be understood that projector elements not specifically shown or described may take various forms well known to those skilled in the art.

Figure 1:
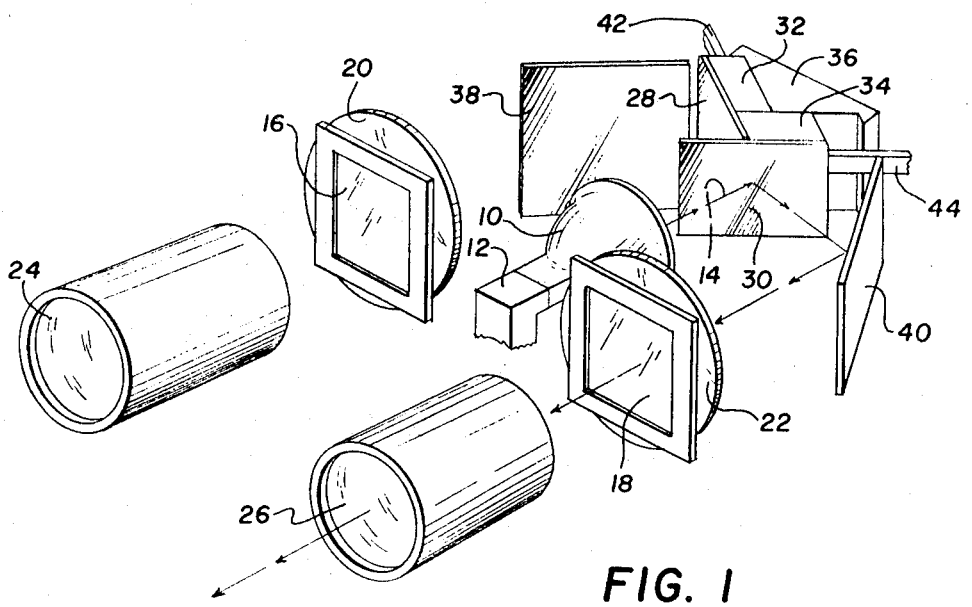
FIG. 1 is a perspective view of a portion of a lamp dissolve projector comprising an illustrative preferred embodiment of the present invention.

Referring to FIG. 1, reference numeral 10 designates a lamp mounted in a socket 12 for emitting light rays along a path 14. A pair of mounted film transparencies or slides 16 and 18 are shown positioned between a pair of condenser lenses 20 and 22 and a pair of objective lenses 24 and 26, respectively. The slides are removably held in the projector by gate means, not shown. A pair of mirrors 28 and 30 are carried by supports 32 and 34, respectively, for sliding movement along their respective planes on a bracket 36. Another set of mirrors 38 and 40 are positioned in the projector to reflect light from mirrors 28 and 30 along light paths which pass through film transparencies 16 and 18, respectively.

Figure 2:
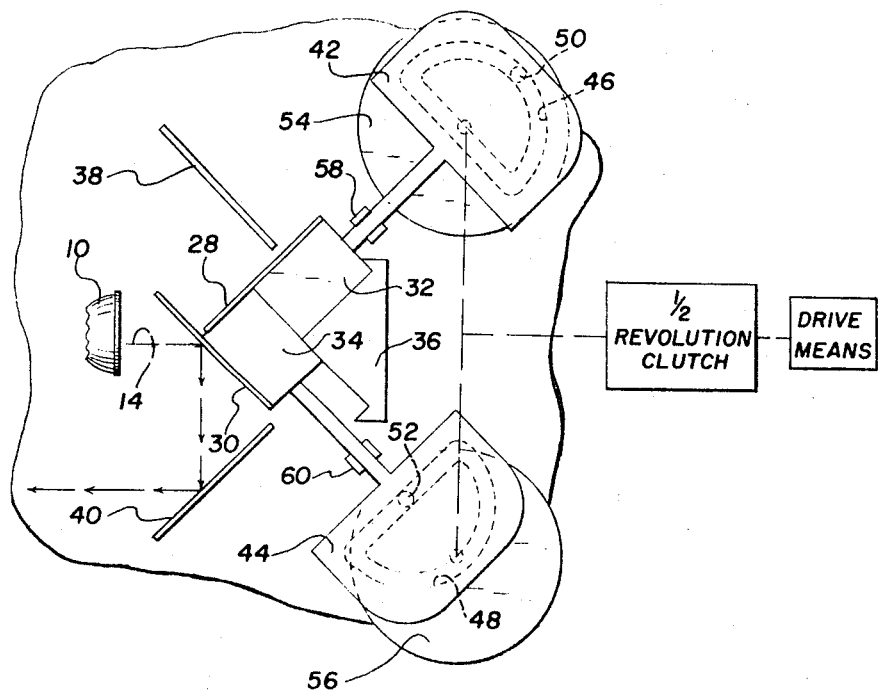
FIG. 2 is a top plan view of a portion of the projector shown in FIG. 1 with the elements of the projector in a first position.

Referring to FIG. 2, mirror support 32 is attached to a linkage 42 and mirror support 34 is attached to linkage 44. Each linkage has a semi-circular recess 46 and 48 therein. A pin 50 which is carried by a rotatable drive disk 54 extends upwardly into recess 46 and a similar pin 52 which is carried by a rotatable drive disk 56 extends upwardly into recess 48. The linkages are constrained to linear movement parallel to the plane of their respective mirrors by a pair of guides 58 and 60.

In the position of the projector elements as shown in FIGS. 1 and 2, mirror support 32 has been drawn to the rear of bracket 36 and mirror support 34 has been extended to a position wherein mirror 30 blocks all of the light from lamp 10 from mirror 28 and reflects that light toward mirror 40 whereat the light beam is folded to be directed through condenser lens 22, transparency 18 and objective lens 26 to a projection screen, not shown, at an image plane. As such, the viewer sees an image of transparency 18 on the screen.

Figure 3:
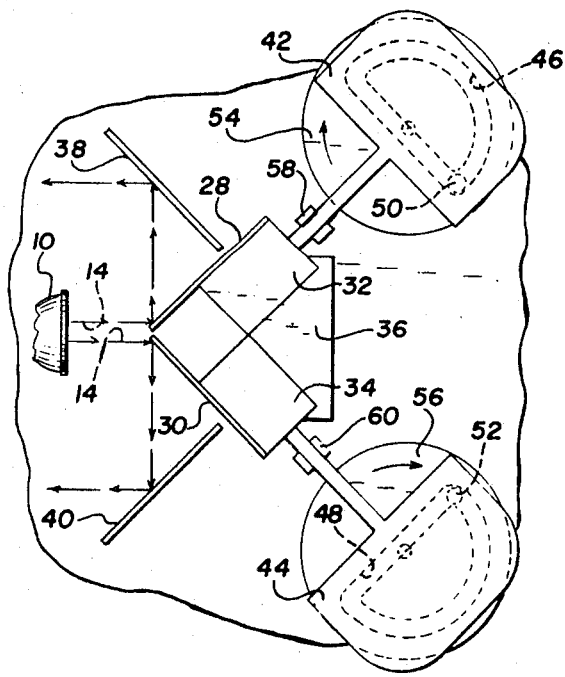
FIG. 3 is a view similar to FIG. 2 with the elements of the projector in a second position.
Figure 4:
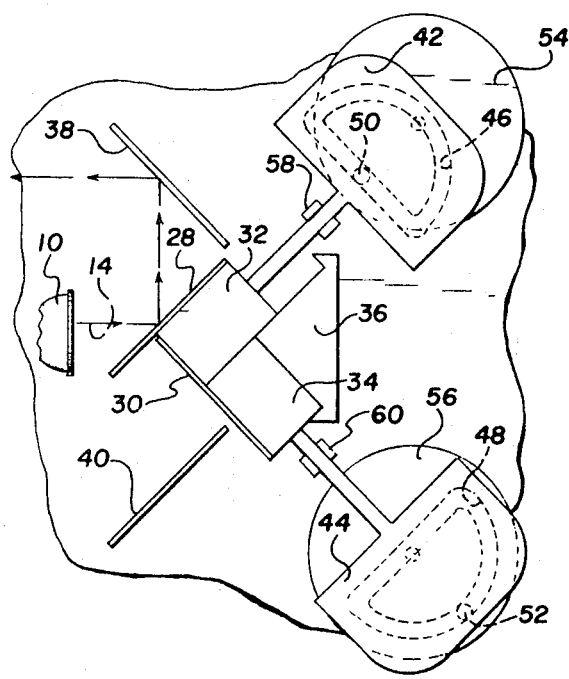
FIG. 4 is a view similar to FIGS. 2 and 3 with the elements of the projector in a third position.

Upon engagement of a one-half revolution clutch 62 which selectively interconnects disks 54 and 56 with a constantly rotating drive means 64, disks 54 and 56 are driven in a clockwise direction as viewed in FIG. 2, through a position shown in FIG. 3, to the position shown in FIG. 4 whereupon the clutch is disengaged.

As disk 54 rotates through an angle of 90° between the position shown in FIG. 2 and the position shown in FIG. 3, pin 50 travels along slot 46 in an arc of the same radius as the slot so as to have no effect on linkage 42, support 32 and mirror 28. During this period, pin 52 on disk 56 travels through an arc to the position shown in FIG. 3, during which time cooperation between that pin and the edges of slot 46 gradually moves linkage 44, support 34 and mirror 30 to the position shown in FIG. 3. As mirror 30 is so moved, it gradually moves partially out of the light path from lamp 10 and uncovers mirror 28 so that by the time that the projector elements have reached the positions shown in FIG. 3, approximately one-half of the light from lamp 10 is reflected by each of mirrors 28 and 30 so that the projected image from transparency 16 has gradually increased to one-half illumination and the projected image from transparency 18 has gradually decreased to one-half illumination.

Disks 54 and 56 continue to rotate from the position shown in FIG. 3 to that of FIG. 4 in a clockwise direction wherein pin 50 now cooperates with the edge of slot 46 to gradually move linkage 42, support 32 and mirror 28 along bracket 36 to their FIG. 4 positions. At the same time, pin 52 on disk 56 continues to move along the constant radius arc of slot 48 to the position shown in FIG. 4 without moving mirror 30. As mirror 28 is moved towards its FIG. 4 position, it gradually moves across mirror 30 to intercept all of the light from lamp 10 and to reflect that light toward mirror 38 which folds the light beam toward transparency 16. Upon reaching the position shown in FIG. 4, the projector elements are arranged such that all of the light from lamp 10 is reflected by mirror 28 along a light path including transparency 16 so that the viewer now sees only the image contained on that transparency on the viewing screen. Clutch 62 is disengaged at this time and remains in that condition until the operator wishes to project the next slide. Upon re-engagement of clutch 62, disks 54 and 56 begin to rotate once more in a clockwise direction to first withdraw mirror 28 to its FIG. 3 position during the first 90° of rotation, and then to extend mirror 30 to its FIG. 2 position during the next 90° of rotation before disengagement of the clutch.

From the above description, it can be seen that I have provided an improved device for dissolving the projected image of one supported film transparency into the projected image of another supported transparency by using shiftable mirrors with a maximum conservation of space in the projector.

The invention has been described in detail with particular reference to a preferred embodiment thereof, but it will be understood that variations and modifications can be effected within the spirit and scope of the invention.

I claim:

1. In projecting apparatus having (1) means defining first, second and third light paths, (2) means for supporting a film transparency in each of said first and second light paths and (3) optical means for forming a projected image of the supported transparencies in an image plane, a device for dissolving the projected image of one supported transparency into the projected image of the other supported transparency, said device comprising:

illumination means for directing light rays along said third light path;

first and second mirrors each having first positions occupying different portions of said third light path for respectively reflecting a portion of said light rays along said first and second light paths, whereby the projected images from said pair of film transparencies are of substantially equal brightness when said mirrors are both in their first positions;

means for moving said first mirror to a second position while said second mirror remains in its first position to (1) gradually block an increasing number of said light rays from said second mirror and (2) reflect the blocked light rays along said first light path; and means for moving said second mirror to a second position while said first mirror remains in its first position to (1) gradually block an increasing number of said light rays from said first mirror and (2) reflect the blocked light rays along said second light path.

2. A device as defined in claim 1 wherein said respective first and second positions of each of said mirrors are coplanar.

3. A device as defined in claim 2 further comprising means for guiding said mirrors between their respective first and second positions substantially within their respective planes.

4. A device as defined in claim 1 further comprising means actuatable to a first condition for sequentially moving (1) said first mirror from its second position to its first position and (2) said second mirror from its first position to its second position, and to a second condition for sequentially moving (1) said second mirror from its second position to its first position and (2) said first mirror from its first position to its second position.

5. In projecting apparatus having (1) means defining first, second and third substantially parallel light paths, (2) means for supporting a film transparency in each of said first and second light paths, and (3) optical means in said first and second light paths for forming a projected image of the supported transparencies in an image plane, a device for dissolving the projected image of one supported transparency into the projected image of the other supported transparency, said device comprising:

illumination means for directing light rays along said third light path;

a first mirror movable in a plane intersecting said third light path from a first position occupying a portion of said third light path for reflecting a portion of said light rays out of said third light path to a second position occupying all of said third light path for reflecting all of said light rays out of said third light path;

a second mirror movable in a plane intersecting said third light path from a first position occupying another portion of said third light path for reflecting another portion of said light rays out of said third light path to a second position occupying all of said third light path for reflecting all of said light ray out of said third light path, the plane of said second mirror intersecting the plane of said first mirror in a line perpendicular to the direction of movement of said mirrors;

means for moving said first mirror between its first and second positions while said second mirror remains in its first position;

means for moving said second mirror between its first and second positions while said first mirror remains in its first position; and means for directing light rays reflected by said first and second mirrors along said first and second light paths, respectively.

6. A device as defined in claim 5 further comprising means actuatable to a first condition for sequentially moving (1) said first mirror from its second position to its first position and (2) said second mirror from its first position to its second position, and to a second condition for sequentially moving (1) said second mirror from its second position to its first position and (2) said first mirror from its first position to its second position.

* * * * *